March 23, 1943. H. J. MURPHY 2,314,728
LOCK NUT DEVICE
Filed March 27, 1941
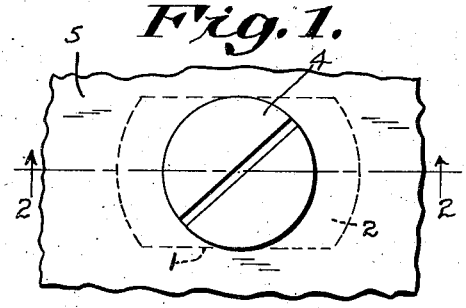
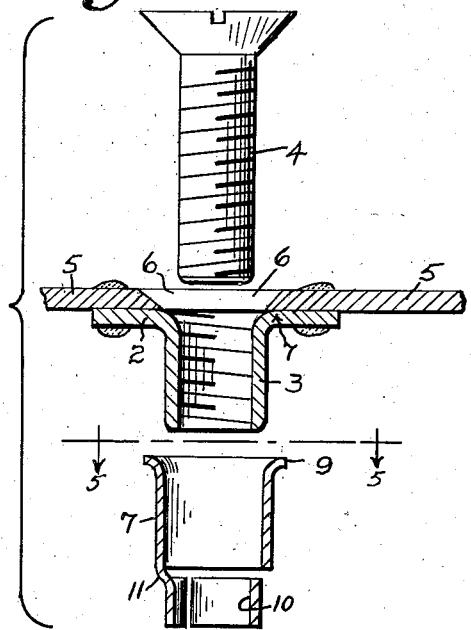
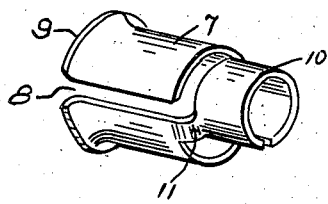
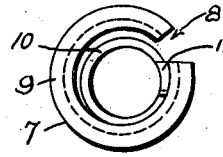
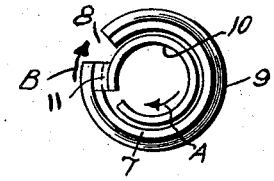
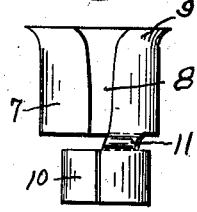
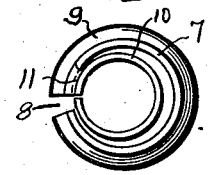
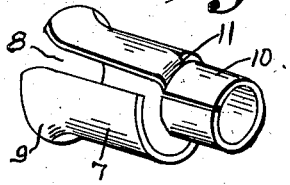
Inventor
Howard J. Murphy.
By John Todd
Attorney Patented Mar. 23, 1943

2,314,728

UNITED STATES PATENT OFFICE 2,314,728

LOCK NUT DEVICE

Howard J. Murphy, Greenwood, Mass., assignor to United-Carr Fastener Corporation, Cambridge, Mass., a corporation of Massachusetts Application March 27, 1941, Serial No. 385,502

4 Claims. (Cl. 151—32)

The present invention relates to threaded fastenings, such as bolt and nut installations and aims generally to improve such fastenings.

A primary object of the invention is the provision of a threaded fastening installation provided with a locking device adapted to be snapped upon the nut member of such installation and to engage the bolt and increase the resistance of the bolt to be moved in unthreading direction.

A further object of the invention is the provision of a locking device adapted for attachment to the outer surfaces of a smooth cylindrical nut member.

A still further object of the invention is the provision of an improved simple locking device for threaded fastening installations which is effectively operative to permit relative turning movement of the screw and nut in threading direction, but which offers a substantially increased resistance to relative movement of the bolt and nut in unthreading direction.

Other objects and advantages of the invention will be apparent to those skilled in the art on reference to the accompanying drawing, wherein I have illustrated preferred embodiments of the invention, and in which Fig. 1 is a plan view of a threaded nut and bolt installation according to the invention;

Fig. 2 is a sectional view taken on the line 2—2 of Fig. 1, the several parts being shown in unassembled relation;

Fig. 3 is a perspective view of the locking device according to a preferred form of the invention;

Fig. 4 is a top plan view of the bolt locking device;

Fig. 5 is a bottom plan view of the locking device;

Fig. 6 is a side elevation of a slightly modified form of locking device;

Fig. 7 is a perspective view thereof; and

Fig. 8 is a top plan view of the modified form of locking device shown in Figs. 6 and 7.

Referring to the drawing, the nut installation may comprise a nut member 1 formed of sheet material having a head 2 and tubular internally threaded shank 3 for the reception of threaded bolt or screw 4.

The nut member may preferably be of the type known as "Teenuts" formed of sheet metal including the shank 3 which has a smooth outer cylindrical surface and a flanged head of rectangular shape secured to a support 5 with the shank bore in alignment with an opening 6 of the support.

A locking device for such Teenut installations is provided in the form of a separate member formed of spring sheet metal and provided with a sleeve 7 adapted to be snapped over the smooth exterior surface of the nut shank 3. The sleeve 7 is preferably slit as at 8 throughout its length so as to be expansible and readily slip over the shank with a relatively tight fit. One end of the sleeve 7 may be slightly outwardly flared as at 9 to conform to the filleted edges between the shank 3 and head 2.

A locking band 10, longitudinally spaced from the sleeve 7 is integrally connected thereto by an extension 11 on the adjoining end of the sleeve adjacent the slit 8 (see Figs. 3 and 4). The locking band is substantially circular in shape and of a diameter preferably slightly less than the outside diameter of the bolt or screw 4. An internal diameter of the locking band equal to the root diameter or even the pitch diameter gives satisfactory results. The band 10, as shown in the drawing, does not form a complete circle and it is spaced from the extension 11 so that the band is expansible over the screw or bolt when the bolt is moved in threading direction and contractible thereon when the bolt is moved in unthreading direction.

It will be noted (Fig. 4) that the band 10 extends from the extension 11 to its opposite end in a clockwise direction, which is opposite to the direction of rotation of the screw in threading direction. Any frictional engagement between the bolt and band therefore tends to expand the band permitting easy threading of the screw in threading direction.

When, however, the screw is moved in unthreading direction, the frictional engagement with the band tends to move it in the same direction, as indicated by the arrow A (Fig. 4), tending to contract it more tightly and clutching it in engagement with the threads of the screw, providing an effective resistance to the movement of the screw in unthreading direction.

It will be noticed that in the preferred form of the invention the split locking band 10 extends from the extension 11 in the opposite direction from the sleeve 7. Thus, as the screw is moved in unthreading direction and the band 10 is contracted by movement in the direction of the arrow A, the sleeve 7 is also contracted by reason of the force applied in the same direction as indicated by the arrows B (Fig. 4), thus causing the split sleeve to tightly grip the nut shank.

The split locking band 10 thus provides an effective lock against unintentional movement of the screw in unthreading direction due to its frictional engagement with a plurality of threads of the screw and it is unnecessary that the inner face of the band be threaded.

The axis of the locking band 10 may be slightly eccentric to the axis of the sleeve 7 so that as the bolt or screw is threaded into the nut and engages the locking band 10, the band is displaced to a position concentric to the nut, tending to force that part of the sleeve 7 axially of the extension 11 more tightly in engagement with the nut shank 3.

In the modified form of invention shown in Figs. 6 to 8 the two sleeve portions 7 and 10 extend from the same side of the extension 11 and in the same direction. This construction is somewhat simpler of manufacture and provides the same effective clutching action on the screw. It is quite effective in installations when there is less or little tendency of the sleeve 7 to slip around the nut shank 3 when the screw and nut are relatively moved in unthreading direction.

The invention provides a simple and novel construction of a sheet metal locking device adapted to be snapped over the shank of a nut, the locking members comprising a split cylindrical base snapped around the nut shank and an integral split locking portion providing a yieldable ring shaped member adapted to wrap around the screw and to be clutched by contraction to the screw when the screw is moved in unthreading direction.

My invention is not to be interpreted narrowly as limited to the specific constructions shown and described, which are intended merely as illustrations of the invention, but includes as well equivalent constructions as may fall within the scope of the appended claims.

I claim:

1. A snap-on nut lock for screw and nut fastenings, comprising a one-piece sheet metal member formed with longitudinally spaced sleeve portions, one of said sleeve portions being of a diameter to be slipped over the end of a nut, and the other sleeve portion being of smaller diameter than said nut-receiving sleeve portion and being spaced from said nut, said latter sleeve constructed to provide a screw-clutching ring for frictionally engaging and gripping the end portion of said screw.

2. A snap-on nut lock for screw and nut fastenings, comprising a sheet metal member formed with longitudinally spaced sleeve portions, one of said sleeve portions being of a diameter to be slipped over the end of said nut, and the other sleeve portion being of smaller diameter than said nut-receiving sleeve portion and being spaced from said nut, said sleeve portions being split and contractible around the nut and screw respectively, as said screw is turned in unthreading direction.

3. A snap-on nut lock for screw and nut fastenings comprising a one-piece sheet metal member formed with longitudinally spaced sleeve portions, one of said sleeve portions being of a diameter to be slipped over the end of said nut, and the other sleeve portion being of smaller diameter than said nut-receiving sleeve portion and being spaced from said nut, and disposed slightly eccentric of the axis thereof, said sleeve portions being split and contractible around the nut and screw respectively as the screw is turned in unthreading direction.

4. A one-piece nut lock for screw and nut fastenings comprising a pair of sleeve members, a bridge portion securely connecting said sleeve members together in spaced relation, one of said sleeve members being of a size to be slipped over the sides of the nut, and the other sleeve member being of smaller diameter than said nut-receiving portion, and being spaced from said nut, said latter sleeve member constituting a screw-clutching ring for frictionally engaging and gripping a portion of said screw threaded into said nut, both of said sleeve portions being split longitudinally and extending from said bridge portion in opposite directions.

HOWARD J. MURPHY.